Feb. 11, 1947.　　　M. VAWRYK　　　2,415,542
SOLDERING IRON
Filed Feb. 7, 1942
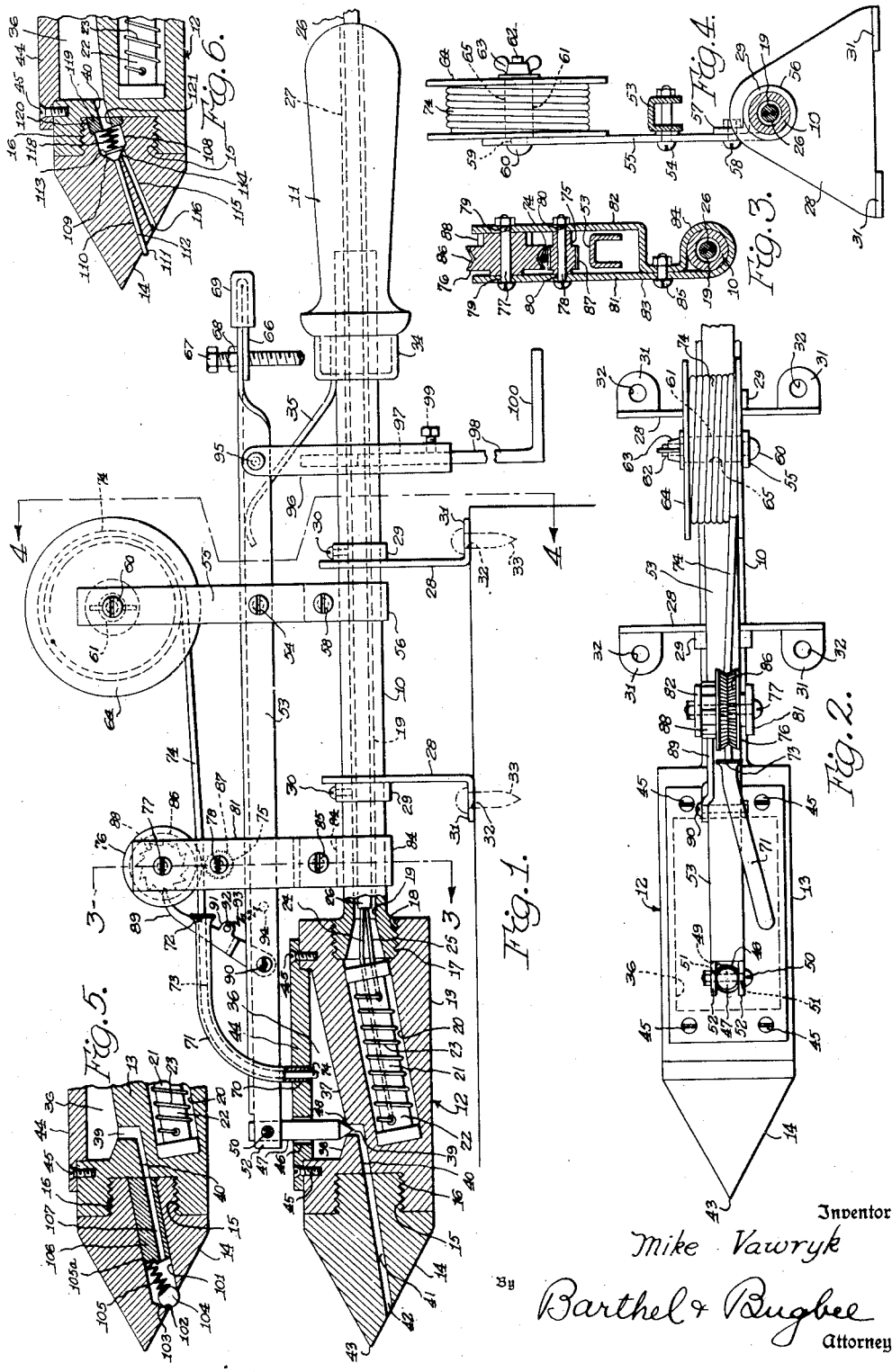
Inventor
Mike Vawryk
By Barthel & Bugbee
Attorneys Patented Feb. 11, 1947

2,415,542

UNITED STATES PATENT OFFICE 2,415,542

SOLDERING IRON

Mike Vawryk, Lyndora, Pa.

Application February 7, 1942, Serial No. 429,853

9 Claims. (Cl. 219—27)

This invention relates to soldering irons and, in particular, to self-heated soldering irons, namely soldering irons with self-containing heaters.

One object of this invention is to provide a self-heated soldering iron and a solder reservoir from which the solder flows to the workpiece through a channel regulated by a control valve.

Another object is to provide a self-heated soldering iron, as set forth in the preceding object, wherein the solder is fed to the solder reservoir by feeding mechanism.

Another object is to provide a self-heated soldering iron as set forth in the preceding objects wherein the solder is automatically fed to the reservoir by feeding mechanism which is operated in cooperation with the valve operating mechanism.

Another object is to provide a self-heated soldering iron, as set forth in the preceding objects, wherein the valve operating member actuates a feeding device which automatically feeds the solder to the solder reservoir.

Another object is to provide an electrically heated soldering iron having a solder reservoir heated by the electrical heating unit which heats the soldering head, the reservoir being connected by a channel to the tip of the soldering head, this channel being regulated by a valve the operation of which automatically feeds solder to the reservoir to replace the supply as it is drawn off through the channel.

Another object is to provide a self-heated soldering iron wherein the soldering head is provided with a solder reservoir and a solder channel controlled by an outlet valve which is operated when the soldering head is engaged with the workpiece to permit solder to flow from the reservoir through the channel to the workpiece.

Another object is to provide a self-heated soldering iron as set forth in the object immediately above wherein the outlet valve consists of a spring-urged plunger, such as a ball, projecting slightly from the surface of the soldering head.

Another object is to provide a self-heated soldering iron, as set forth in the second preceding object, wherein the outlet valve is a plunger having a stem projecting slightly from the surface of the soldering head.

Another object is to provide a self-heated soldering iron having a soldering head and a handle with a support attached to the handle which is adapted either to support the soldering iron upon a work bench or other surface, or secure the soldering iron firmly to the bench.

Another object is to provide a self-heated soldering iron having a solder reservoir connected to the soldering head by a channel controlled by a valve which in turn is actuated either manually or by a foot pedal connection, hold-down means also being preferably provided to anchor the soldering iron while the work is being passed in front of the soldering head, thereby leaving both hands of the operator free to manipulate the work.

This application is a continuation-in-part of my co-pending application, Serial No. 329,217, filed April 12, 1940, for Soldering iron, issued November 3, 1942, as Patent No. 2,300,716.

In the drawing:

Figure 1 is a side elevation, partly in section, of a soldering iron according to a preferred embodiment of the invention.

Figure 2 is a top plan view of the feed portion of the soldering iron shown in Figure 1.

Figure 3 is a vertical cross-section through the solder feeder mechanism taken along the line 3—3 in Figure 1.

Figure 4 is a vertical cross-section taken along the line 4—4 in Figure 1, showing the solder feeding reel and its adjacent parts.

Figure 5 is a vertical longitudinal section through a portion of the head of a modified soldering iron.

Figure 6 is a view similar to Figure 5 but of a further modified soldering iron.

*General arrangement*

In general, the soldering iron of this invention consists of a handle with a soldering head secured thereto and containing a heater, such as an electrical heating unit. The head also contains a solder reservoir having a solder channel or conduit extending from the reservoir to the tip of the soldering head. This channel is controlled by a valve placed at the junction of the channel with the reservoir (Fig. 1) or in a first modification (Fig. 5) by a valve placed at the outlet of the channel and operated by contact with the workpiece; or, in a second modification (Fig. 6), by a plunger valve having its head placed at an intermediate position within the channel and operated by a stem projecting slightly from the soldering head.

In the preferred form of the invention (Fig. 1) the valve is operated by mechanism the actuation of which also feeds solder to the reservoir to replenish the solder drawn off by the operations upon the workpiece. The solder is shown as being supplied from a reel or drum and passed through a feeding device having a feeding ratchet which is operated step by step in response to the operation of the valve lever. In this manner, when the operator shifts the valve lever to release solder into the solder channel, the same motion operates the ratchet to feed additional solder from the reel to the reservoir.

The soldering iron of the invention is also provided with supports mounted upon the handle thereof and serving either as a rest upon which to support the soldering iron out of contact with the work bench or for anchoring it to the work bench. In the latter event, mechanism operated by a foot pedal is connected to the valve lever so as to permit the solder supplying and feeding mechanism to be operated by the foot of the operator, thus leaving his hands free to manipulate the work.

Manually fed soldering iron

Referring to the drawing in detail, Figure 1 shows a soldering iron having a tubular shaft 10 with a handle 11 at one end and a soldering head, generally designated 12 at the other end. The soldering head 12 consists of a base 13 and a tip 14 with a threaded stem 15 engaging a threaded aperture 16. The base 13 contains a threaded bore 17 for receiving the threaded end 18 of the shaft 10.

The shaft 10 is provided with an internal bore 19 communicating with a heater chamber within the head base 13. The heater bore 20 contains an electrical heating unit 21 consisting of a holder 22 of heat resisting material having a heating coil 23 wound thereon and connected to the leads 24 and 25 which in turn pass outward in a cord 26 passing through the bore 19 of the shaft 10 and through a connecting bore 27 in the handle 11. The cord 26 is connected to the usual plug (not shown) which may be inserted in the ordinary electrical outlet so as to supply electric current to the soldering iron.

In order to support the soldering iron, a pair of brackets 28 are provided with collar portions 29 encircling the shaft 10 and secured thereto as at 30. The supports 28 are provided with ears 31 having apertures 32 by which the brackets 28 may be anchored to a work bench or other suitable location, as by the screws 33. The handle 11 is provided with a ferrule 34 beneath into which is inserted a flat spring 35 extending upwardly and forwardly away from the shaft 10.

The base 13 of the soldering head 12 in its upper portion is provided with a depression from a solder reservoir 36 having bottom walls 37 and 38 sloping downwardly toward a port 39 leading into a solder channel 40 which is aligned with a solder channel 41 extending through the tip 14 to an outlet 42 adjacent the point 43 thereof. A cover plate 44 secured as at 45 to the base 13 above the reservoir 36 serves to close the reservoir 36.

The cover plate 44 is provided with an aperture 46 immediately above the port 39 for receiving a valve plunger 47 having a pointed tip 48 extending downwardly into the port 39. The valve plunger 47 is provided with a cross-bore 49 for receiving a pivot screw 50 which in turn passes through aligned bores 51 in the opposite side walls 52 of the channel-shaped valve lever 53.

The valve lever 53 is provided at its mid-portion with a pivot screw 54 (Figs. 1 and 4) by which it is pivotally mounted upon a solder holder support 55. The latter is in the form of an upstanding strip with a curved portion 56 encircling the shaft 10 and having its lower end 57 secured to its upstanding portion by the clamping screw 58. The upper end of the solder holder 55 is provided with an aperture 59 for receiving a screw 60 which serves to anchor the stud 61 to the holder 55. The outer end 62 of the stud 61 is threaded to receive a wing nut 63 which in turn serves to retain upon the stud 61 a solder holder 64 in the form of a reel or spool and having a central bore 65 which fits loosely over the stud 61.

The valve lever 53 rearwardly of the solder holder support 55 is engaged by the upwardly projecting spring 35 which serves to urge the rearward end of the valve lever 53 upward, thereby forcing the valve plunger 47 downward with its tip 48 closing the port 39 leading out of the solder reservoir 36. In order to adjust the movement of the valve lever 43, the rearward end of the latter is provided with a bent back portion 66 which is threaded to receive an adjusting screw 67 and a lock nut 68. A thumb piece 69 is mounted upon the rearward end of the valve lever 53 of the bent back portion 66.

The cover plate 44 for the solder reservoir 36 is provided with a bore 70 which receives one end of a tubular guide 71 bent in the form of an arc and having a bell-mouthed portion 72 and an internal bore 73 through which passes a portion of wire solder 74, the opposite end of which is wound upon the solder holder 64. The wire solder 74 passes between knurled feeding wheels 75 and 76 mounted respectively on pivot screws 77 and 78 passing through paired apertures 79 and 80 in the upstanding parallel portions 81 and 82 (Fig. 3) of the feeder support 83. The latter is provided with a loop portion 84 encircling the shaft 10 and clamped thereto by the clamping screw 85.

The feeding wheel 76 is provided with a knurled V groove 86 which engages the upper edge of the wire solder 74 and forces it into engagement with the knurled surface 87 of the knurled feeding wheel 75. The feeding wheel 76 is also provided with a ratchet wheel portion 88 which is engaged by a pawl 89 (Fig. 1) pivotally mounted upon the pivot screw 90 which passes through the side walls of the valve lever 53. The pawl 89 is provided with an ear 91 having a hole 92 for the connection of one end of a coil spring 93, the opposite end of which is secured as at 94 to the valve lever 53. In order to leave both hands of the operator free for manipulating the work, the valve lever 53 is provided with a pivot pin 95 (Fig. 1) extending between the side walls of the valve lever 53 to which is pivotally connected the upper end of a rod 96 having a socket 97 for adjustably receiving a rod 98 secured therein as by the set screw 99 and terminating in a foot pedal portion 100.

Operation

In the operation of the soldering iron of Figure 1, the operator inserts the plug on the end of the cord 26 into an appropriate outlet, thereby energizing the heating coil 23 within the heating chamber 20. As the latter becomes incandescent, it heats the soldering head 12 and with it the walls of the solder reservoir 36.

If only small quantities of solder are to be used at a time, the operator may now feed wire solder 74 from the solder holder 64 through the tubular guide 73 down into the reservoir 36 by merely pressing the thumb downward upon the thumb piece 69 at the end of the valve lever 53, operating the latter repeatedly until the solder begins to flow. This causes the ratchet pawl 89 to operate the ratchet wheel 88 rotating the knurled feeding wheel 76 and feeding the wire solder 74 forward. If, however, the operator wishes to accumulate a supply of solder in the reservoir 36, he can rotate the knurled feeding wheel 76 independently of the valve lever 53 merely by applying his thumb thereto, thereby feeding the wire solder 74 into the reservoir 36 without operating the valve plunger 47.

The operator now applies the tip 14 of the soldering head 12 to the work, or brings the work into contact therewith, at the same time operating the valve lever 53 to raise the valve plunger 47. This opens the port 39 to permit solder to pass from the reservoir 36 through the channels 40 and 41 and outlet 42 upon the workpiece. A flux can be applied previously to the workpiece or, as is optional, the wire solder 74 may be cored with the flux. Such cored solder is of tubular form with the central bore containing the flux, such as rosin. In either case, as the solder engages the workpiece, it adheres thereto by reason of the presence of the flux, and unites the portions of the workpiece which the operator has intended to unite.

If the operator wishes to use both hands in manipulating the work, he may clamp the soldering iron in a vise or secure it to the work bench by anchoring the brackets 28 thereto. He may then employ the foot pedal 100 to operate the valve lever 53 and the valve plunger 47 and feed the solder to the reservoir 36. By this means, he can adjust the work and manipulate it in a very accurate and precise way.

To adjust the amount of solder which is fed at a given stroke by the valve lever 53 operating the pawl 89, the operator loosens the lock nut 68 and moves the adjusting screw 67 up or down. This regulates the throw of the valve lever 53 and accordingly regulates the distance which the pawl 89 moves at each stroke, and in turn regulates the amount of rotation of the knurled feeding wheel 76 for each stroke of the valve lever 53.

*Modification with ball outlet valve*

The modified soldering iron shown in Figure 5 is generally similar to the form shown in Figure 1, but differs in the means for controlling the flow of solder to the workpiece. For this purpose, the tip 14 is supplied with an enlarged bore 101 having a reduced outlet 102 with an end wall 103 adjacent thereto and serving as a seat for a ball 104 pressed into engagement therewith by a coil spring 105. The latter sits against the end 105a of a tubular plug 106 inserted in the bore 101 and having a channel 107 aligned with the channel 40.

In the operation of the modification shown in Figure 5 the solder is placed in the reservoir 36 or fed therein as previously described in connection with Fig. 1. From the reservoir 36 the melted solder passes downward through the port 39, and the channels 40 and 107 into the lower end of the bore 101 where it accumulates behind the ball 103.

When the operator presses the tip 14 of the soldering head against the workpiece, the ball 104 is forced inward from off its seat 103, permitting solder to flow from the enlarged bore 101 through the aperture 102. When the operator lifts the head away from the workpiece, the spring 105 closes the aperture 102 by urging the ball 104 into engagement with the seat 103. This prevents further flow of solder until the soldering head is again re-engaged with the workpiece.

*Modification with plunger outlet valve*

The modification shown in Figure 6 employs a tip with an enlarged bore 108 having a tapered end 109 leading into a bore 110 which passes downwardly through the tip and serves to receive the stem 111 of a valve plunger 112 having a tapered head 113 engaging the tapered seat 109. Also passing through the tip from a port 114 in the tapered end 109 is a channel 115 having an outlet 116 at the lower end thereof. A coil spring 118 is seated at one end against the valve plunger head 113 and at the other end against the plug 119 inserted in a counter bore 120 leading into the bore 108. The plug 119 is provided with a bore 121 aligned with the bore 40 leading from the solder reservoir 36.

The operation of the modification shown in Figure 6 is similar to that shown in Figure 5. To start the flow of solder the operator presses the tip 14 of the soldering head 12 against the workpiece, thereby pushing the valve stem 111 inward against the urge of the coil spring 118 and lifting the valve plunger head 113 off its tapered seat 109. This uncovers the port 114. Meanwhile, solder has flowed from the reservoir 36 through the channels 40 and 121 into the enlarged bore 108. When the valve 112 is thus pushed inward by engagement with the workpiece, the valve head 113 uncovers the port 114, permitting solder to flow through the channel 115 and outward through the outlet 116 on to the workpiece. When the operator moves the tip 14 out of engagement with the workpiece, the spring 118 pushes the valve plunger head 113 back into engagement with the seat 109 closing the port 114 and preventing further flow of the solder.

While a specific embodiment of the invention has been described and illustrated, it will be understood that various modifications may be made within the scope of the appended claims without departing from the spirit of the invention.

What I claim is:

1. In a soldering iron, a soldering head having a tip, a solder reservoir within said head having a forwardly inclined bottom wall, heating means within said head contiguous to said wall, a solder conduit leading from said reservoir through said tip, a valve seat interconnecting said reservoir and conduit, valve means for regulating the flow of solder through said conduit movable toward and away from said valve seat, manually operable lever means for controlling said valve means, said conduit being inclined downwardly and forwardly within said tip in a plane substantially parallel with the bottom wall of the reservoir and solder feeding means interconnecting said manually operable lever means for feeding solder to said reservoir simultaneously with the operation of said lever means.

2. In a soldering iron, a soldering head having a tip, a solder reservoir within said head, heating means within said head, a solder conduit leading from said reservoir through said tip, valve means for regulating the flow of solder through said conduit, manually operable lever means connected to said soldering iron for controlling said valve means, a holder for solid solder and means operably interconnecting said manually operable lever means and said solid solder holder for simultaneously feeding said solder from said holder into said reservoir upon operation of said lever means and said valve means to establish communication between said reservoir and solder conduit.

3. In a soldering iron, a soldering head having a tip, a solder reservoir within said head, heating means within said head, a solder conduit leading from said reservoir through said tip, valve means for regulating the flow of solder through said conduit, manually operable lever means for controlling said valve means, a holder for solid solder and ratchet feeding mechanism operably connected to said manually operable lever means for simultaneously feeding said solder from said holder into said reservoir upon operation of said manually operable lever means.

4. In a soldering iron, a soldering head having a tip, a solder reservoir within said head, heating means within said head, a solder conduit leading from said reservoir through said tip, valve means for regulating the flow of solder through said conduit, a holder for solid solder and means responsive to the operation of said valve means for simultaneously and positively feeding said solder from said holder into said reservoir upon operation of the valve means.

5. In a soldering iron, a soldering head having a tip, a solder reservoir within said head, heating means within said head, a solder conduit leading from said reservoir through said tip, valve means for regulating the flow of solder through said conduit, manually operable lever means for controlling said valve means, a holder for solid wire solder, a guide for guiding said wire solder into said reservoir, solder feeding mechanism interposed between said holder and said guide and means interconnecting said lever means with said solder feeding mechanism, whereby operation of said lever means to control said valve means will operate said solder feeding mechanism, said solder feeding mechanism comprising a ratchet member adapted to be rotated in a step by step fashion upon operation of said lever means and having a friction roller directly and drivingly engaging said solid solder.

6. In a soldering iron, a soldering head having a tip, a solder reservoir within said head, heating means within said head, a solder conduit leading from said reservoir through said tip, valve means for regulating the flow of solder through said conduit, a holder for solid wire solder, a guide for guiding said wire solder into said reservoir, manually operable feeding mechanism interposed between said holder and said guide, and responsive to the operation of said valve means for feeding said solder through said guide into said reservoir.

7. In a soldering iron, a soldering head having a tip, a solder reservoir within said head, heating means within said head, a solder conduit leading from said reservoir through said tip, a valve member operable to open and close said conduit, a solid solder holder, a handle connected to said head, a valve operating member mounted on said handle, and means responsive to the shifting of said valve operating member for feeding solder from said holder into said reservoir.

8. In a soldering iron, a soldering head member having a tip, a solder conduit leading through said head member to said tip, a handle member connected to said head member, a solid solder holder connected to one of said members, means for feeding solder from said holder into said conduit, valve means for opening and closing said conduit, and manually operable lever means for controlling said valve means, said lever means being operatively connected to said feeding means whereby solder will be fed from said feeding means simultaneously with the operation of said valve means.

9. In a soldering iron, a soldering head having a tip, a solder reservoir within said head, heating means within said head, a solder conduit leading from said reservoir through said tip, valve means for regulating the flow of solder through said conduit, a holder for solid solder, means operably connected to said valve means for regulating the flow of solder through said conduit, means operably connected to said valve means for feeding solder from said holder into said reservoir upon operation of the valve means, and foot operated mechanism connected to said valve means for operating said valve means and said feeding means.

MIKE VAWRYK.

REFERENCES CITED

The following references are of record in the file of this patent:

UNITED STATES PATENTS

| Number | Name | Date |
|---|---|---|
| 1,596,432 | Hensen | Aug. 17, 1926 |
| 1,724,070 | Byrne et al. | Aug. 13, 1929 |
| 1,893,093 | Linville et al. | Jan. 3, 1933 |
| 1,927,570 | Lofthouse | Sept. 19, 1933 |
| 2,261,015 | Brody | Oct. 28, 1941 |
| 2,228,291 | Weston | Jan. 14, 1941 |
| 1,519,127 | Gaffney | Dec. 16, 1924 |
| 1,631,063 | Rognley | May 31, 1927 |